US012260988B2

(12) United States Patent
Ishigaki et al.

(10) Patent No.: US 12,260,988 B2
(45) Date of Patent: Mar. 25, 2025

(54) COIL DEVICE

(71) Applicant: TDK CORPORATION, Tokyo (JP)

(72) Inventors: Katsuhiro Ishigaki, Tokyo (JP); Hideaki Harata, Tokyo (JP); Shoichi Tani, Tokyo (JP)

(73) Assignee: TDK CORPORATION, Tokyo (JP)

( * ) Notice: Subject to any disclaimer, the term of this patent is extended or adjusted under 35 U.S.C. 154(b) by 784 days.

(21) Appl. No.: 17/517,240

(22) Filed: Nov. 2, 2021

(65) Prior Publication Data

US 2022/0139602 A1 May 5, 2022

(30) Foreign Application Priority Data

Nov. 4, 2020 (JP) ................................ 2020-184291

(51) Int. Cl.
*H01F 5/04* (2006.01)
*H01F 27/28* (2006.01)
*H01F 27/29* (2006.01)
*H01F 27/32* (2006.01)

(52) U.S. Cl.
CPC ........... *H01F 5/04* (2013.01); *H01F 27/2828* (2013.01); *H01F 27/29* (2013.01); *H01F 27/325* (2013.01); *H01F 2005/043* (2013.01); *H01F 2027/297* (2013.01)

(58) Field of Classification Search
CPC ........ H01F 5/04; H01F 27/2828; H01F 27/29; H01F 27/325; H01F 2005/043; H01F 2027/297
See application file for complete search history.

(56) References Cited

U.S. PATENT DOCUMENTS

2011/0043315 A1* 2/2011 Kobayashi ............ H01F 27/325 29/606
2012/0001887 A1* 1/2012 Park ...................... H01F 27/325 336/221
2012/0182112 A1* 7/2012 Lu ............................ H01F 5/04 336/192
2012/0320505 A1* 12/2012 Lee ......................... H01F 27/29 361/679.01
2015/0116068 A1* 4/2015 Kwon ................... H01F 27/325 336/192
2017/0018347 A1* 1/2017 Boldl .................... H01F 27/292
2022/0277888 A1* 9/2022 Kwon ..................... H01F 27/24

FOREIGN PATENT DOCUMENTS

JP 2009-194336 A 8/2009
JP 2009218425 A * 9/2009

* cited by examiner

*Primary Examiner* — Malcolm Barnes
(74) *Attorney, Agent, or Firm* — Oliff PLC

(57) ABSTRACT

A coil device includes a coil portion and a bobbin. The coil portion includes wires connectable to terminals. The bobbin includes a first terminal block and a second terminal block formed on both sides in a winding axis direction of a cylindrical portion for forming the coil portion around the cylindrical portion. A length of the first terminal block in a width direction perpendicular to the winding axis direction is larger than that of the second terminal block in the width direction.

10 Claims, 7 Drawing Sheets

COIL DEVICE

BACKGROUND OF THE INVENTION

The present invention relates to a coil device used as, for example, a transformer.

In the transformer shown in Patent Document 1, for example, a plurality of terminals is attached to each of a pair of terminal blocks arranged on both sides of a bobbin cylinder portion (coil portion), and a primary winding wire and a secondary winding wire wound around the bobbin cylinder portion are drawn to the plurality of terminals.

When such a transformer is mounted on a circuit board together with other electronic devices, such as ICs, it is normal to arrange other electronic devices around the large-sized transformer as the transformer is comparatively large compared to other electronic devices.

When the pair of terminal blocks is lengthened to secure a sufficient insulation distance in accordance with increase in current and voltage of transformers, however, the mounting area of the coil device including other electronic devices inevitably becomes large.

Patent Document 1: JP2009194336 (A)

BRIEF SUMMARY OF INVENTION

The present invention has been achieved under such circumstances. It is an object of the invention to provide a coil device capable of reducing a mounting area of the coil device including other electronic devices in mounting the coil device on a circuit board together with other electronic devices, such as IC chips.

To achieve the above object, a coil device according to the present invention comprises:

a coil portion including wires connectable to terminals; and a bobbin including a first terminal block and a second terminal block formed on both sides in a winding axis direction of a cylindrical portion for forming the coil portion around the cylindrical portion, wherein a length of the first terminal block in a width direction perpendicular to the winding axis direction is larger than that of the second terminal block in the width direction.

In the coil device according to the present invention, since the first terminal block is longer than the second terminal block, one coil device can favorably be used for obtaining a large number of outputs from a small number of inputs by arranging a large number of terminals on the first terminal block. A plurality of terminals can be arranged and attached to the first terminal block, which is longer than the second terminal block, at wide intervals. Thus, electronic devices, such as IC chips, can be arranged side by side near the first terminal block and connected to the terminals of the first terminal block while the insulation between the terminals is being maintained, and the insulation between the electronic devices can also be maintained.

When comparatively large electronic devices, such as IC chips, are arranged side by side in the vicinity of the first terminal block, which is longer than the second terminal block, the side spaces of the second terminal block, which is comparatively short, can be secured. When other comparatively small electronic devices are arranged in these vacant side spaces of the second terminal block, compared with the case where both terminal blocks have the same length, the mounting area of the coil device including other electronic devices, such as IC chips, can be reduced.

Preferably, the first terminal block includes an extension section protruding outward from an outline of the coil portion in the width direction, and at least one of the terminals is attached to the extension section. This configuration can sufficiently increase the intervals between the terminals of the first terminal block.

Preferably, the first terminal block includes a reinforcement portion. The reinforcement portion prevents the first terminal block, which is long in the width direction, from bending and can strengthen the coil device.

Preferably, the reinforcement portion includes a first wire contact portion for contacting with a lead portion of at least one of the wires drawn from the coil portion to at least one of the terminals. More preferably, the first wire contact portion changes a drawing direction of the lead portion of at least one of the wires.

When the lead portion of at least one of the wires comes into contact with the first wire contact portion while being drawn from the coil portion to at least one of the terminals and changes its drawing direction, it is possible to shorten free portions of at least one of the wires between inflection points, where the drawing direction is changed. When the free portions are shortened, the resonance frequency of the lead portion of at least one of the wires can be increased. Thus, the mounting board and the wires are prevented from resonating with each other, and the wires become less likely to break.

Preferably, the first terminal block includes a protrusion portion, and the protrusion portion includes a second wire contact portion for contacting with a lead portion of at least one of the wires drawn from the coil portion to at least one of the terminals. More preferably, the second wire contact portion changes a drawing direction of the lead portion of at least one of the wires.

When the lead portion of at least one of the wires comes into contact with the second wire contact portion while being drawn from the coil portion to at least one of the terminals and changes its drawing direction, it is possible to shorten free portions of at least one of the wires. Thus, the resonance frequency of the lead portion of at least one of the wires can be increased, the mounting board and the wires are prevented from resonating with each other, and the wires become less likely to break.

Preferably, the first wire contact portion is disposed closer to the coil portion than the second wire contact portion. When the wire contact portions are arranged in such a manner, the lead portion is drawn in zigzag manner, and it is possible to prevent at least one of the wires from being broken due to the resonance of at least one of the wires.

Preferably, the lead portion of at least one of the wires has a resonance frequency of 2000 Hz or higher.

Preferably, a lead portion of at least one of the wires drawn from the coil portion to at least one of the terminals is divided into a plurality of free portions, and the free portions have a largest length of 15 mm or less. In this configuration, the lead portion of at least one of the wires is prevented from resonating with the mounting board and becomes less likely to break.

DETAILED DESCRIPTION OF INVENTION

Hereinafter, the present invention is explained based on embodiments shown in the figures.

Figure 1:
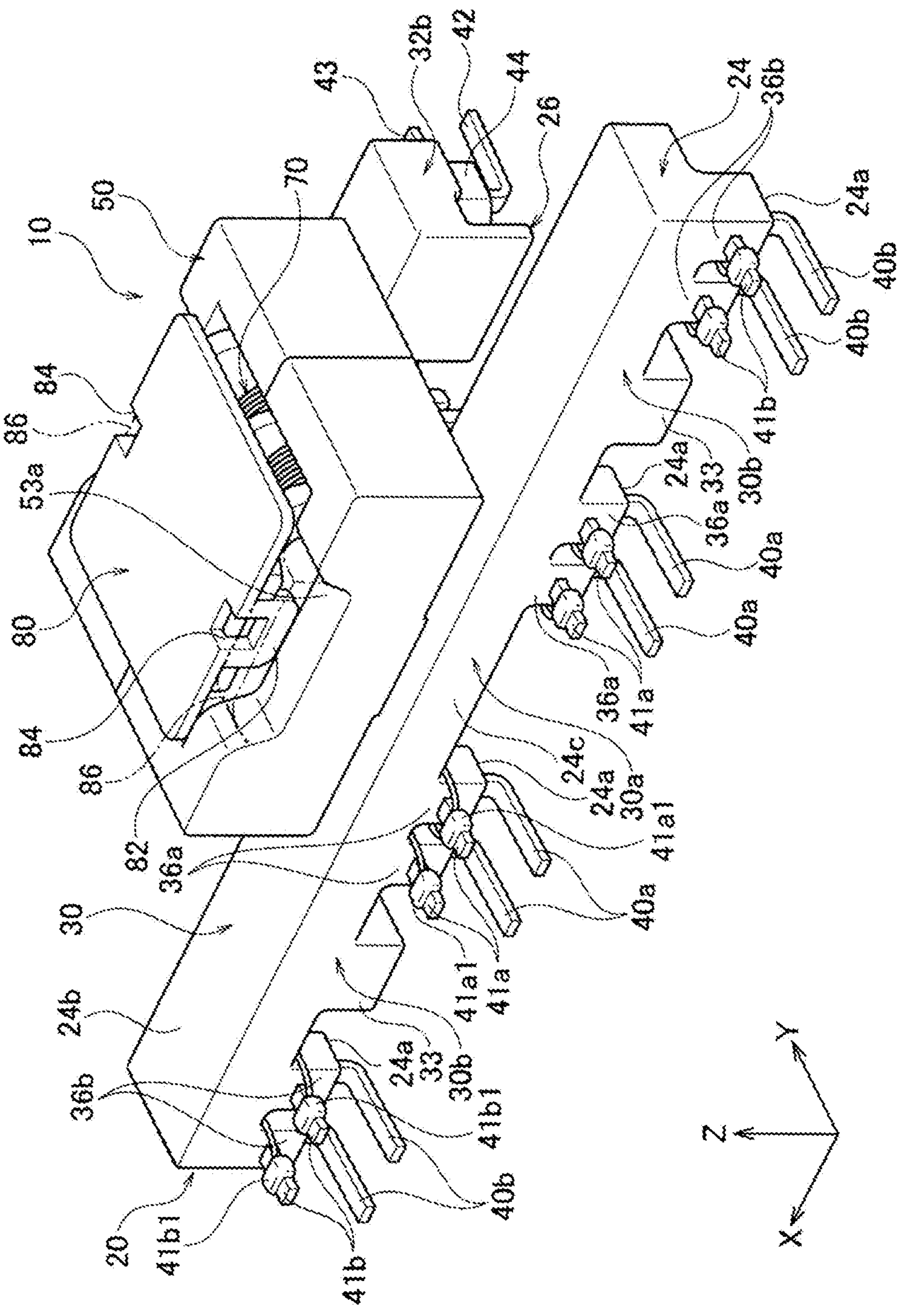
FIG. 1 is a schematic perspective view of a transformer according to an embodiment of the present invention.

As shown in FIG. 1, a transformer 10 as a coil device according to an embodiment of the present invention includes a bobbin 20, a core portion 50, and a cover plate 80.

Figure 2:
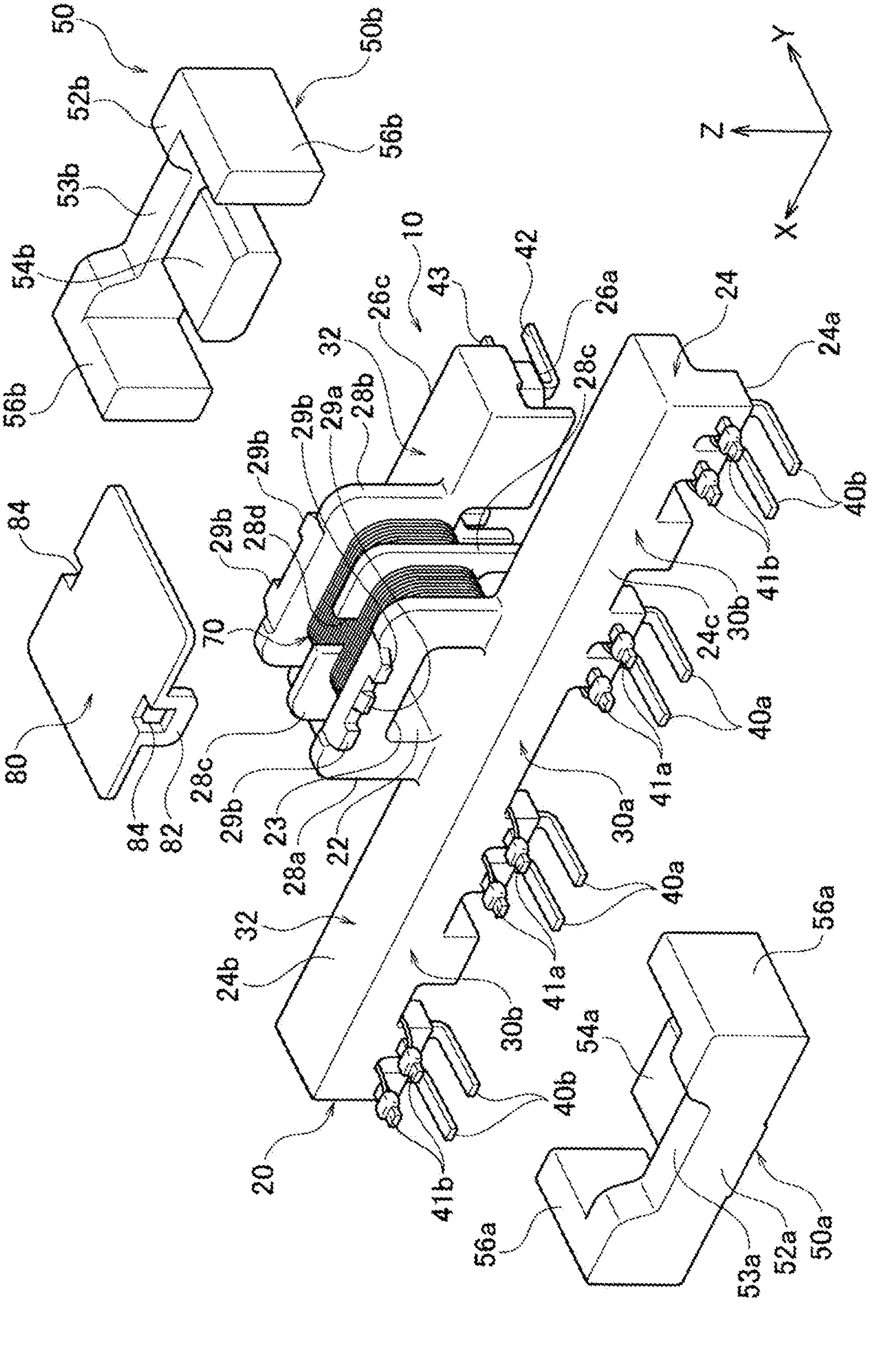
FIG. 2 is an exploded perspective view of the transformer shown in FIG. 1.

As shown in FIG. 2, the bobbin 20 includes a cylinder portion 22 in which a plurality of wires 72 constituting a coil portion 70 is wound so as to be insulated from each other. A first terminal block 24 and a second terminal block 26 are formed integrally on both ends of the cylinder portion 22 in the Y-axis direction. In the present embodiment, the terminal blocks 24 and 26 have a long shape in the X-axis direction and are formed integrally with lower parts in the Z-axis direction of flange portions 28*a* and 28*b* formed integrally on both ends of the cylinder portion 22 in the Y-axis direction so as not to cover a through hole 23 of the cylinder portion 22.

In the figures of the present embodiment, the X-axis, the Y-axis, and the Z-axis are perpendicular to each other, and the Y-axis is parallel to the direction of the winding axis of the coil portion 70, the X-axis is parallel to the width direction of the terminal blocks 24 and 26, and the Z-axis is parallel to the height direction directed from the mounting surface to the anti-mounting surface.

Figure 4:
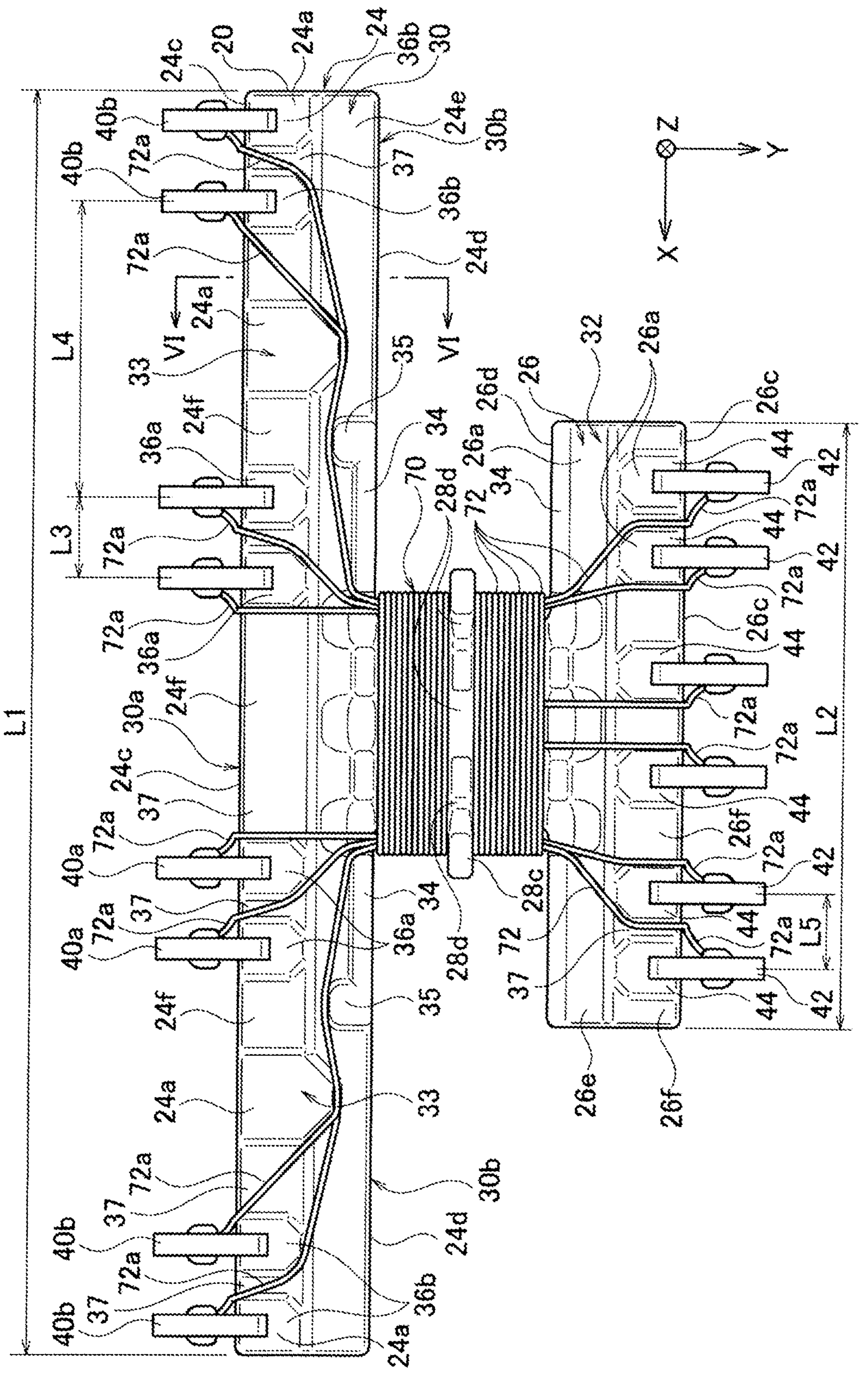
FIG. 4 is a bottom view of the transformer shown in FIG. 1.

As shown in FIG. 2, a single or a plurality of flange portions 28*c* may be formed integrally with the cylinder portion 22 at an intermediate position of the cylinder portion 22 located between the flange portion 28*a* and the flange portion 28*b*. The flange portion(s) 28*c* may be discontinuous along the circumferential direction. In the middle of the circumferential direction of the flange portion(s) 28*c*, one notch 28*d* may be formed on the upper side in the Z-axis, and three or a plurality of notches 28*d* may be formed on the lower side in the Z-axis as shown in FIG. 4.

As shown in FIG. 2, an engagement convex portion 29*a* and a pair of holding convex portions 29*b* located on both sides of the engagement convex portion 29*a* in the X-axis direction are formed integrally at the upper ends in the Z-axis direction of the flange portions 28*a* and 28*b* formed integrally at both ends of the cylinder portion 22 in the Y-axis direction. The convex portions 29*a* and 29*b* are formed so as to protrude in the Y-axis direction from the end surfaces of the flange portions 28*a* and 28*b* in the Y-axis direction.

The engagement convex portions 29*a* are detachably engaged with engagement holes 84 of attachment rings 82 formed on both sides of the cover plate 80 in the Y-axis direction. The attachment rings 82 are formed so as to protrude downward in the Z-axis direction from the cover plate 80. When the engagement convex portions are engaged with the engagement holes 84 of the attachment rings 82, the holding convex portions 29*b* hold each of the attachment rings 82 from both sides in the X-axis direction, and the cover plate 80 cannot be detached from the top of the bobbin 20 unless a special force is applied to the attachment rings 82.

The top surface of the cover plate 80 is a flat surface and can be adsorbed to the tip of an adsorption nozzle for moving the transformer 10 as a finished product. The cover plate 80 and the bobbin 20 are preferably made of insulating members, but are not necessarily made of the same member.

The bobbin 20 is formed by, for example, injection molding. For example, the bobbin 20 is made of any material, such as PBT, PET, LCP, and PA, or is made of a phenol resin from the viewpoint of heat resistance. The cover plate 80 can be made of a material similar to that of the bobbin 20, but may be made of an insulating member excluding resin, such as ceramic and paper, for its simple shape. If molding is possible, the bobbin 20 may also be made of an insulating member excluding resin.

Terminals 40*a*, 40*b*, and 42 mentioned below are insert-molded on the bobbin 20, but the terminals 40*a*, 40*b*, and 42 may be fixed to the molded bobbin by press fitting, adhesion, etc. without being insert-molded together with the bobbin 20.

Middle leg portions 54*a* and 54*b* of the core portion 50 are inserted from both sides in the Y-axis direction into the through hole 23 of the cylinder portion 22 formed in the bobbin 20. In the present embodiment, the core portion 50 is formed from a first split core 50*a* and a second split core 50*b*. The first split core 50*a* includes a plate-shaped portion 52*a* parallel to a plane including the X-axis and the Z-axis and the middle leg portion 54*a* protruding in the Y-axis direction from a substantially central part of the plate-shaped portion 52*a* in the X-axis direction. At both ends of the plate-shaped portion 52*a* in the X-axis direction on both sides of the middle leg portion 54*a* in the X-axis direction, outer leg portions 56*a* protrude in the Y-axis direction with predetermined intervals from the middle leg portion 54*a*. The protrusion height of the middle leg portion 54*a* from the plate-shaped portion 52*a* and the protrusion height of the outer leg portions 56*a* are substantially the same.

A notch 53*a* is formed at the upper end in the Z-axis direction at the center of the plate-shaped portion 52*a* in the X-axis direction. The notch 53*a* is almost formed to the base of the middle leg portion 54*a*. The notch 53*a* is disposed so that the attachment ring 82 of the cover plate 80 does not interfere with the core 50*a*.

The second split core 50*b* includes a plate-shaped portion 52*b* parallel to a plane including the X-axis and the Z-axis and a middle leg portion 54*b* protruding in the Y-axis direction from a substantially central part of the plate-shaped portion 52*b* in the X-axis direction. At both ends of the plate-shaped portion 52*b* in the X-axis direction on both sides of the middle leg portion 54*b* in the X-axis direction, outer leg portions 56*b* protrude in the Y-axis direction with predetermined intervals from the middle leg portion 54. The protrusion height of the middle leg portion 54*b* from the plate-shaped portion 52*b* and the protrusion height of the outer leg portions 56*b* are substantially the same.

A notch 53*b* is formed at the upper end in the Z-axis direction at the center of the plate-shaped portion 52*b* in the X-axis direction. The notch 53*b* is almost formed to the base of the middle leg portion 54*b*. The notch 53*b* is disposed so that the attachment ring 82 of the cover plate 80 does not interfere with the core 50*b*.

As mentioned above, the middle leg portions 54*a* and 54*b* of the cores 50*a* and 50*b* are inserted into the through hole 23 of the cylinder portion 22 of the bobbin 20 from both sides in the Y-axis direction, and the tips of the middle leg portions 54*a* and 54*b* are butted against each other. To adjust the performance of the core portion 50, there may be a gap between the tips of the middle leg portions 54*a* and 54*b*. In the present embodiment, the tips of the outer leg portions 56*a* and 56*b* of the cores 50*a* and 50*b* are butted against each other so as to surround both sides of the coil portion 70 (i.e., the flange portions 28*a*-28*c*) in the X-axis direction. The cores 50*a* and 50*b* may be adhered to the cover plate 80 and the bobbin 20 with an adhesive agent 86.

The cores 50*a* and 50*b* are not limited, but are magnetic materials and made of ferrite composition, metal composition, composite composition of them and resin, or the like. The cores 50*a* and 50*b* are manufactured by firing after compression molding, firing after injection molding, general powder compression molding, etc.

As shown in FIG. 4, a first-terminal-block main body 30 of the first terminal block 24 has a long shape in the X-axis direction intersecting the Y-axis parallel to the winding axis of the coil portion 70 and has a length of L1 in the X-axis direction. The main body 30 includes a central section 30*a* located within the range of the outline of the coil portion 70 in the longitudinal direction and extension sections 30*b* protruding from the outline of the coil portion 70 toward both outer sides in the X-axis direction in the longitudinal direction.

As shown in FIG. 1, center-side terminal attachment portions 36*a* are arranged at predetermined intervals in the X-axis on the lower side in the Z-axis direction near the central section 30*a*. In FIG. 1, center-side first terminals 40*a* protrude in the Z-axis direction from mounting surfaces 24*a* of four center-side terminal attachment portions 36*a* and are fixed by bending in the Y-axis direction.

Extension-side terminal attachment portions 36*b* are arranged at a predetermined interval in the X-axis on the lower side in the Z-axis of the extension section 30*b* on the left side in FIG. 1. In the illustration, the extension-side first terminals 40*b* are fixed by protruding in the Z-axis direction from the mounting surfaces 24*a* of two extension-side terminal attachment portions 36*b* and bending in the Y-axis direction. Extension-side terminal attachment portions 36*b* are arranged at a predetermined interval in the X-axis on the lower side in the Z-axis direction of the extension section 30*b* on the right side in FIG. 1. In the illustration, the extension-side first terminals 40*b* are fixed by protruding in the Z-axis direction from the mounting surfaces 24*a* of two extension-side terminal attachment portions 36*b* and bending in the Y-axis direction.

Each of the center-side first terminals 40*a* is electrically connected to a center-side first terminal connection piece 41*a* protruding in the Y-axis direction from an outer surface 24*c* of the first terminal block 24 on the upper side in the Z-axis direction. In the present embodiment, each of the center-side first terminals 40*a* is made of, for example, a substantially U-shaped metal terminal piece formed integrally with the center-side first terminal connection piece 41*a*. When the substantially U-shaped metal terminal piece is insert-molded near the mounting surfaces 24*a* of the center-side terminal attachment portions 36*a* in the vicinity of the central section 30*a*, plural pairs of the center-side first terminal 40*a* and the center-side first terminal connection piece 41*a* are fixed to the center-side terminal attachment portions 36*a* of the central section 30*a*.

Each of the extension-side first terminals 40*b* is electrically connected to an extension-side first terminal connection piece 41*a* protruding in the Y-axis direction from an outer surface 24*c* of the first terminal block 24 on the upper side in the Z-axis direction. In the present embodiment, each of the extension-side first terminals 40*b* is made of, for example, a substantially U-shaped metal terminal piece formed integrally with the extension-side first terminal connection piece 41*b*. When the substantially U-shaped metal terminal piece is insert-molded near the mounting surfaces 24*a* of the extension-side terminal attachment portions 36*b* in the vicinity of the central section 30*b*, plural pairs of the extension-side first terminal 40*b* and the extension-side first terminal connection piece 41*b* are fixed to the extension-side terminal attachment portions 36*b* of the extension section 30*b*.

Figure 3:
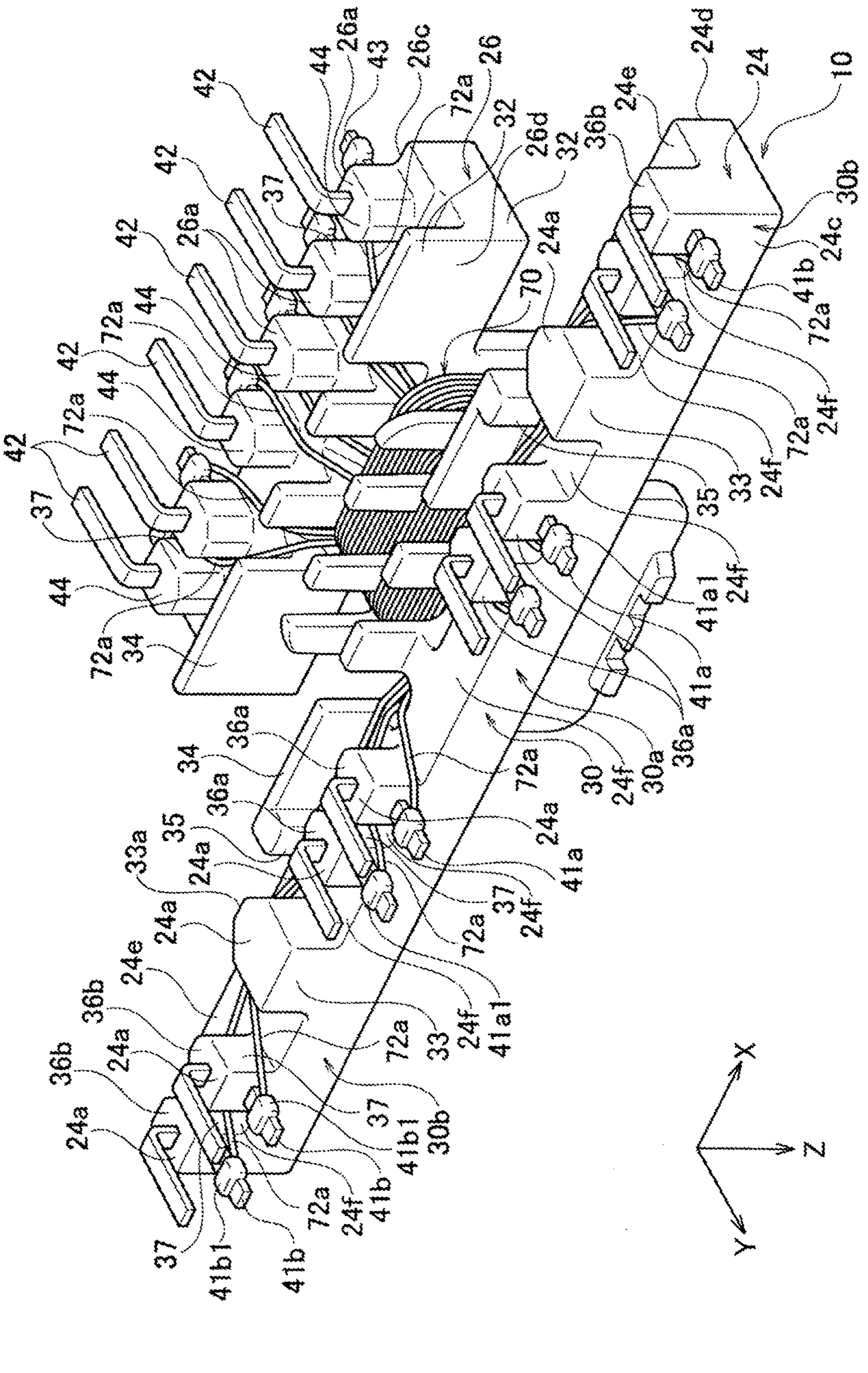
FIG. 3 is a bottom-side perspective view of the transformer shown in FIG. 1.

As shown in FIG. 4, a second-terminal-block main body 32 of the second terminal block 26 has a long shape in the X-axis direction intersecting the Y-axis parallel to the winding axis of the coil portion 70 and has a length of L2 in the X-axis direction. As shown in FIG. 3, second terminal attachment portions 44 are arranged on the lower side of the second terminal block 26 in the Z-axis. In the illustration, the second terminals 42 are fixed by protruding in the Z-axis direction from mounting surfaces 26*a* of six second terminal attachment portions 44 and bending in the Y-axis direction.

Each of the second terminals 42 is electrically connected to a second terminal connection piece 43 protruding in the Y-axis direction from an outer surface 26*c* of the second terminal block 26 on the upper side in the Z-axis direction. In the present embodiment, each of the second terminals 42 are made of, for example, a substantially U-shaped metal terminal piece formed integrally with the second terminal connection piece 43. When the substantially U-shaped metal terminal piece is insert-molded near the mounting surfaces 26*a* of the second terminal attachment portions 44, plural pairs of the second terminal 42 and the second terminal connection piece 43 are fixed to the second terminal attachment portions 44.

Figure 6:
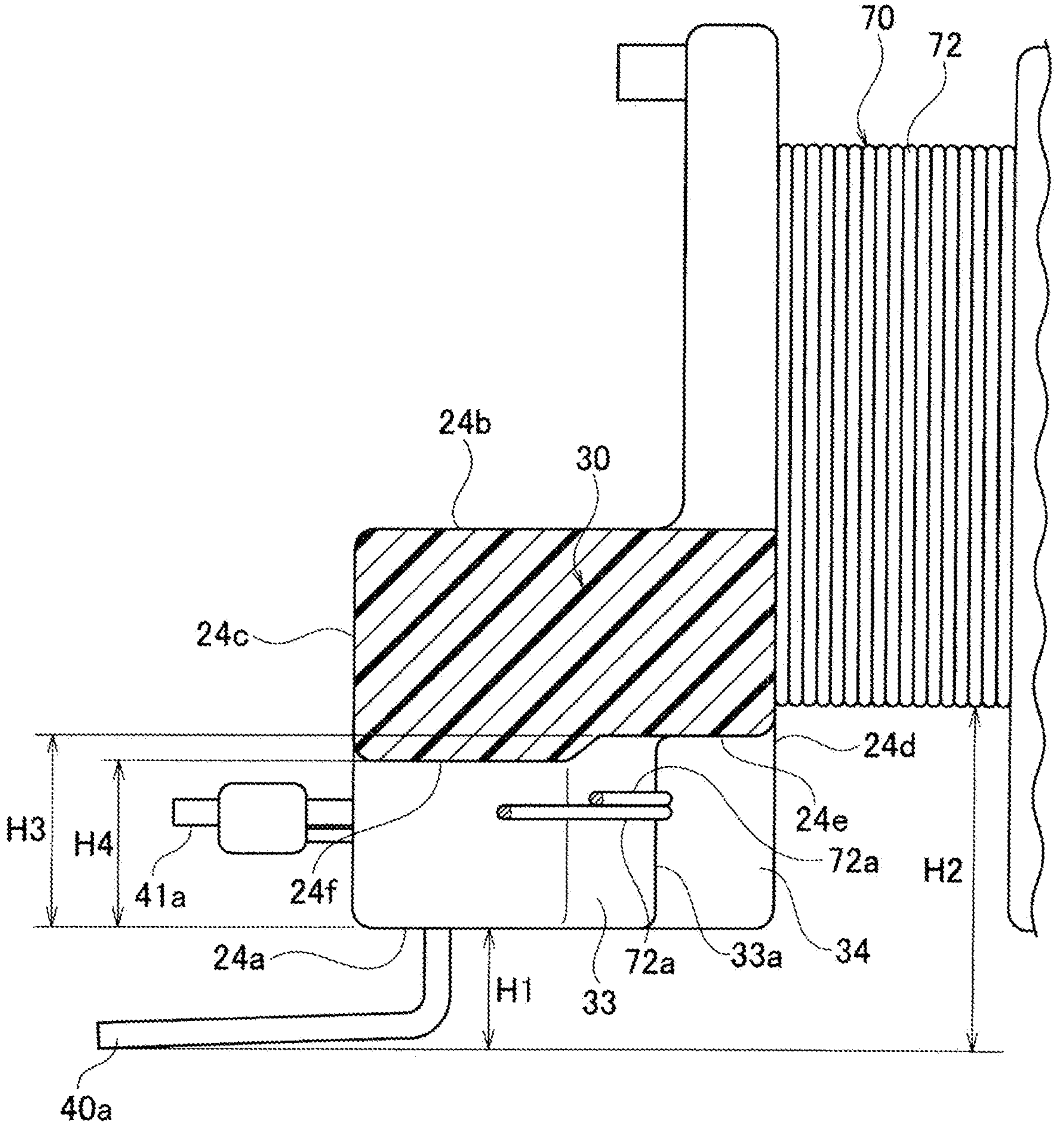
FIG. 6 is a cross-sectional view of the transformer along the VI-VI line of FIG. 4.

As shown in FIG. 6, the mounting surfaces 24*a* (the same applies to the mounting surfaces 26*a* shown in FIG. 3) are higher than the terminal 40*a* (the same applies to the terminals 40*b* and 42 shown in FIG. 1) by a height H1. The coil portion 70 is higher than the terminal 40*a* (the same applies to the terminals 40*b* and 42 shown in FIG. 1) by a height H2.

In the present embodiment, the terminals 40*a*, 40*b*, and 42 including the connection pieces 41*a*, 41*b*, and 43 shown in FIG. 1 are not limited, but are made of, for example, metal, such as copper, copper alloy, iron, iron alloy, and CP wire. The terminals 40*a*, 40*b*, and 42 can be integrated with the bobbin 20 by insert molding or the like at the time of forming the bobbin 20 by injection molding, but may be attached to the bobbin 20 by other methods.

The wires 72 constituting the coil portion 70 and connected to the connection pieces 41*a*, 41*b*, and 43 of the terminals 40*a*, 40*b*, and 42 are not limited and are, for example, conductive wires, such as insulation-coated copper, copper alloy, iron, iron alloy, and CP wire. The insulating material constituting the insulating coating is not limited, but is urethane, polyamideimide, ETFE, or the like.

Figure 5:
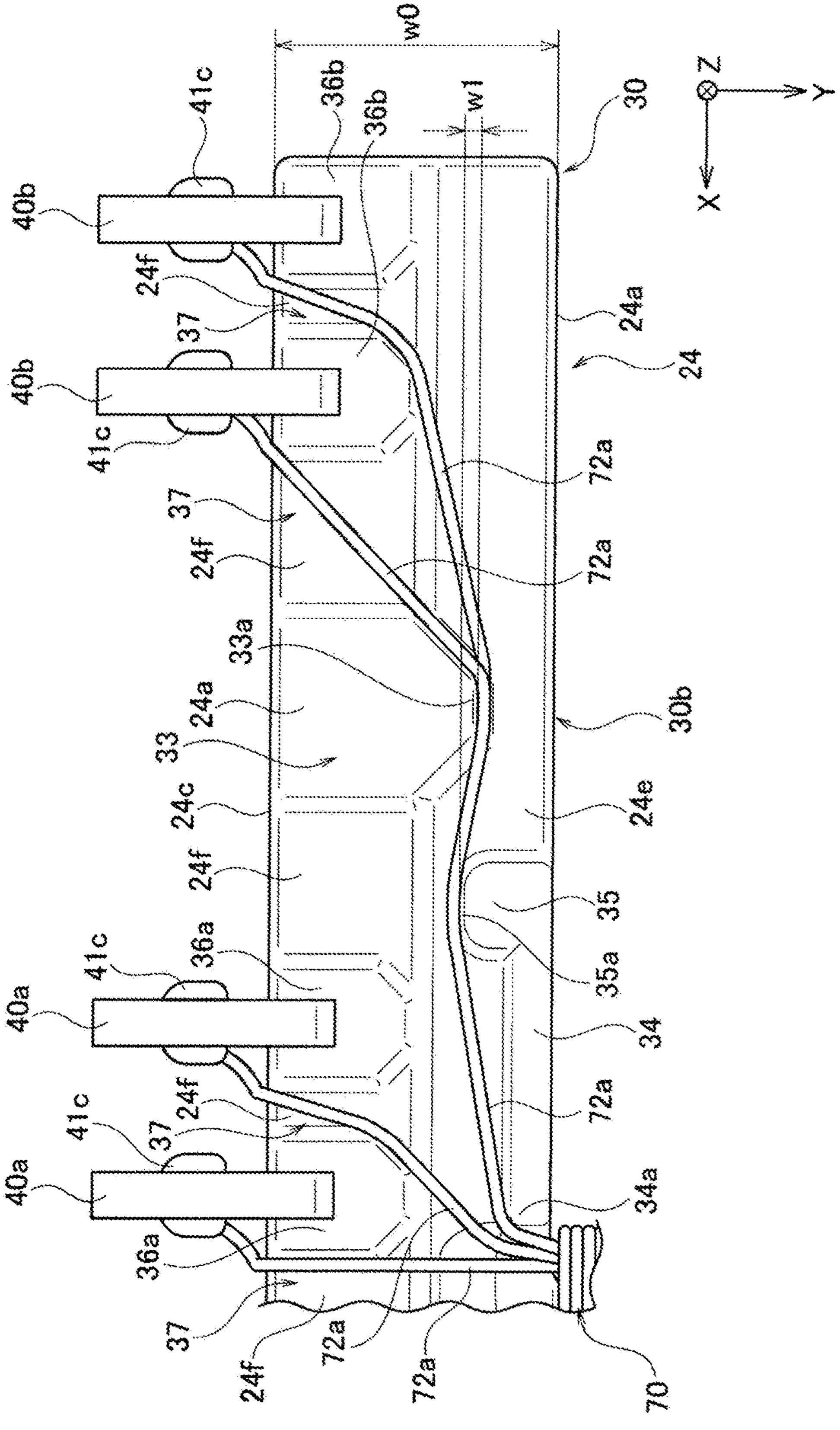
FIG. 5 is a partially enlarged view of the bottom view of the transformer shown in FIG. 4.
Figure 7:
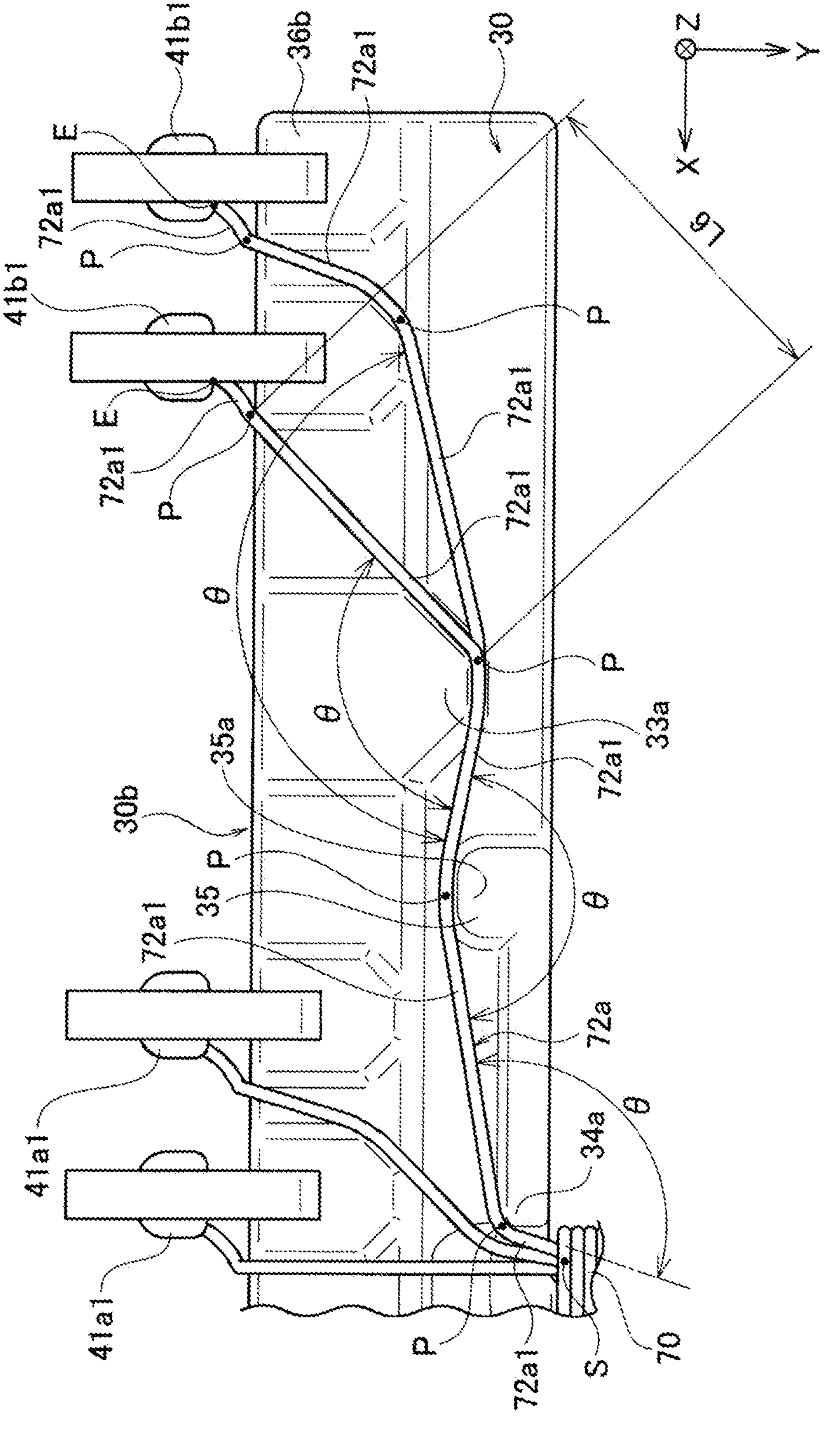
FIG. 7 is a schematic view illustrating drawing directions of lead portions of the wires shown in FIG. 5.

As shown in FIG. 3 to FIG. 5, the wires 72 include the lead portions 72*a* extending from the coil portion 70 to the connection pieces 41*a*, 41*b*, and 43. As mentioned below, the lead portions 72*a* arranged on the lower side of the first terminal block 24 in the Z-axis direction are bent in contact with the first terminal block 24 and include some free portions 72*a*1 as shown in FIG. 7.

As shown in FIG. 4, the center-side terminal attachment portions 36*a* into which the center-side first terminals 40*a* are inserted are formed in the vicinity of the central section 30*a* of a second bottom surface 24*f* on the lower side of the first terminal block 24 in the Z-axis direction. Lead grooves 37 are formed between the adjacent center-side terminal attachment portions 36*a*. The lead grooves 37 guide the lead portions 72*a* to the outer surface 24*c* of the first terminal block 24. The lead portions 72*a* guided to the outer surface 24*c* via the lead grooves 37 are connected to the center-side first terminal connection pieces 41*a* shown in FIG. 3 located outside the lead grooves 37 in the Y-axis. The connection is carried out by any method, such as solder, laser welding, arc welding, thermocompression bonding, and resistance welding.

As shown in FIG. 4, the extension-side terminal attachment portions 36*b* into which the extension-side first terminals 40*b* are inserted are formed on second bottom surfaces 24*f* of the extension sections 30*b* of the first terminal block 24. Lead grooves 37 are formed between the adjacent extension-side terminal attachment portions 36*b*. The lead grooves 37 guide the lead portions 72*a* to the outer surface 24*c* of the first terminal block 24. The lead portions 72*a* guided to the outer surface 24*c* via the lead grooves 37 are connected to the extension-side first terminal connection pieces 41*b* shown in FIG. 3 located outside in the X-axis. The connection is carried out as described above.

Reinforcement portions 33 thicker than the first-terminal-block main body 30 in the Z-axis direction are formed in the middle of the second bottom surface 24*f* between the extension-side terminal attachment portions 36*b* and the center-side terminal attachment portions 36*a*. The lead grooves 37 are also formed between the reinforcement portions 33 and the extension-side terminal attachment portions 36*b*. The lead grooves 37 guide the lead portions 72*a* to the outer surface 24*c* of the first terminal block 24. The lead portions 72*a* guided to the outer surface 24*c* via the lead grooves 37 are connected to the extension-side first terminal connection piece 41*b* adjacent to each of the reinforcement portions 33. The connection is carried out as described above.

A boundary wall 34 is formed along an inner surface 24*d* at a central part of the first terminal block 24 in the Y-axis direction. The boundary wall 34 protrudes from the first-terminal-block main body 30 in the Z-axis direction. The protrusion height of the boundary wall 34 in the Z-axis is substantially the same as that of the attachment portions 36*a* and 36*b* and the reinforcement portions 33 from the main body 30.

A guide groove through which the lead portions 72*a* directed to the terminal connection pieces 41*b* located at the end of the first terminal block 24 in the X-axis direction passes is formed between the boundary wall 34 and the mounting portions 36*a*. The boundary wall 34 is provided with guide notches through which the lead portions 72*a* directed from the coil portion 70 to the terminal connection pieces 41*a* and 41*b* pass. In the present embodiment, protrusion portions 35 protruding outward in the Y-axis are formed on both sides of the boundary wall 34 in the X-axis.

As shown in FIG. 6, the bottom surface of the terminal-block main body 30 includes a first bottom surface 24*e* and a second bottom surface 24*f* having different heights in a stepped manner. The height H3 from the first bottom surface 24*e* to the mounting surface 24*a* is larger than the height H4 from the second bottom surface 24*f* to the mounting surface 24*a*.

As shown in FIG. 4, similarly to the bottom surface of the first terminal block 24, the bottom surface of the second terminal block 26 on the lower side in the Z-axis direction includes a first bottom surface 26*e* and a second bottom surface 26*f* having different heights in a stepped manner. The second terminal attachment portions 44 into which the second terminals 42 are inserted are formed at predetermined intervals in the X-axis direction on the second bottom surface 26*f*.

Lead grooves 37 are formed between the adjacent second terminal attachment portions 44. The lead grooves 37 guide the lead portions 72*a* of the wires 72 drawn from the coil portion 70 to the outer surface 26*c* of the second terminal block 26. As shown in FIG. 3, the lead portions 72*a* of the wires 72 guided to the outer surface 26*c* via the lead grooves 37 are connected to the second terminal connection pieces 43 located near the lead grooves 37. The connection is carried out as described above.

As shown in FIG. 3, a boundary wall 34 is formed along an inner side surface 26*d* on the second-terminal-block main body 32 of the second terminal block 26. As with the boundary wall 34 of the first terminal block 24, the boundary wall 34 protrudes from the second-terminal-block main body 32 in the Z-axis direction. The protrusion height of the boundary wall 34 in the Z-axis is substantially the same as that of the attachment portions 44 from the main body 32. The boundary wall 34 is provided with guide notches through which the lead portions 72*a* directed from the coil portion 70 to the terminal connection pieces 43 pass.

As shown in FIG. 5, a protrusion 35 and a reinforcement portion 33 are arranged from the center side toward the outside in the X-axis, where the load portions 72 are guided, on the bottom surfaces 24*e* and 24*f* of each of the extension sections 30*b* of the first terminal block 24. A wire contact portion 35*a* for contacting with the middle of the lead portions 72*a* is formed at the protrusion tip of the protrusion 35 protruding from the end of the boundary wall 34 in the X-axis toward the outside in the Y-axis (the side away from the center of the coil portion 70 in the X-axis or the Y-axis).

The reinforcement portion 33 is provided with a wire contact portion 33*a* protruding from the reinforcement portion 33 toward the inside in the Y-axis (the side toward the center of the coil portion 70 in the X-axis or the Y-axis) to contact with the middle of the lead portions 72*a*. The wire contact portions 33*a* and 35*a* are displaced in the X-axis direction. In addition, the wire contact portions 33*a* and 35*a* protrude in opposite directions in the Y-axis direction and overlap with each other by a predetermined width w1 when viewed from the X-axis direction.

Thus, the two lead portions 72*a* drawn from the coil portion 70 and directed toward the extension-side first terminals 40*b* are in contact with at least both of the wire contact portions 33*a* and 35*a* to form a zigzag shape. The width w1 is smaller than the width w0 of the first terminal block 24 in the Y-axis direction. Preferably, w1/w0 is 0 to ½. More preferably, w1/w0 is 1/20 to ⅕.

In the present embodiment, the two lead portions 72*a* drawn from the coil portion 70 and directed to the extension-side first terminals 40*b* are also in contact with a wire contact portion 34*a* corresponding with the notch of the boundary wall 34 in the vicinity of the coil portion 70 in addition to the wire contact portions 33*a* and 35*a*. The lead portions 72*a* are also in contact with the extension-side terminal attachment portions 36*b* in the vicinity of the terminals 40*b*.

As shown in FIG. 7, each of the lead portions 72 is in contact with the wire contact portions 34*a*, 33*a*, and 35*a* and the other contact portions and thereby has inflection points P where a drawing direction is changed by, for example, an angle θ. That is, each of the lead portions 72*a* extending to the extension-side first terminals 40*b* is connected from the coil portion 70 to a connection portion 41*b*1 of the extension-side first terminal 40*b* by changing the drawing directions at the inflection points P including a drawing start point S and a drawing end point E.

The free portions 72*a*1 of the lead portions 72*a* are between the inflection point P and the inflection point P close to each other of the lead portions 72*a* including the drawing start point S and the drawing end point E. The lead portions 72*a* are divided into a plurality of free portions 72*a*1 on both sides of the inflection point P.

In the present embodiment, the turning angle θ is 180° or less, preferably 90°≤θ<180°. In particular, the angle θ of the inflection point P is preferably 90°≤θ≤175° at the wire contact portions 33*a* and 35*a*.

In the present embodiment, since the first terminal block 24 is longer than the second terminal block 26 as shown in FIG. 1, one transformer 10 can favorably be used for obtaining a large number of outputs from a small number of inputs by arranging a large number of terminals 40*a* and 40*b* on the first terminal block 24. For example, the transformer 10 of the present embodiment is used in an inverter circuit for driving a motor and a compressor and can be used in applications such as automobiles, industrial equipment, home appliances, and housing equipment.

A plurality of terminals 40*a* and 40*b* can be arranged and attached to the first terminal block 24, which is longer than the second terminal block 26, at wide intervals. For example, the pitch interval L3 of the pair of terminals 40*a* and 40*b* is determined so that the minimum insulation distance is maintained, but the pitch interval L4 between the center-side first terminal 40*a* and the extension-side first terminal 40*b* can be determined comparatively long. As with the pitch interval L4, the pitch interval of the pair of center-side first terminals 40*a* can be determined long.

For example, the pitch interval L3 is preferably 2.5 mm to 5 mm, and the pitch interval L4 can preferably be lengthened to 8 mm or more. Thus, electronic devices, such as IC chips, can be arranged side by side near the first terminal block 24 and connected to the terminals 40*a* and 40*b* of the first terminal block 24 while the insulation between the pair of terminals 40*a* or 40*b* is being maintained, and the insulation between the IC chips can also be maintained.

In the present embodiment, since the four pairs of terminals 40*a* and 40*b* are attached to the first terminal block 24 at the predetermined pitch interval L4, four electronic devices whose sizes are the pitch interval L4 or less can be arranged side by side near the first terminal block 24.

When electronic devices that are next largest to the transformer 10, such as IC chips, are arranged side by side in the vicinity of the first terminal block 24, which is longer than the second terminal block 26, the second terminal block 26, which is comparatively short, can be spaced on both sides in the X-axis direction. When other comparatively small electronic devices are arranged in these vacant side spaces of the second terminal block 26, compared with the case where both terminal blocks have the same length, the mounting area of the transformer 10 and its related devices including other electronic devices, such as IC chips, can be reduced.

In the present embodiment, the first terminal block 24 includes the extension sections 30*b* protruding from the outline of the coil portion 70 toward outside in the X-axis direction, and the extension sections 30*b* are provided with at least a pair of terminals 40*b*. This configuration can sufficiently increase the pitch interval L4 between the terminals 40*a* and 40*b* of the first terminal block 24.

In the present embodiment, as shown in FIG. 3, the second terminal block 26 is provided with three pairs of second terminals 42 in total. As shown in FIG. 4, the pitch interval L5 of each pair of terminals 42 is substantially the same as the pitch interval L3 mentioned above. The length L2 of the second terminal block 26 is smaller than the length L1 of the first terminal block 24. L2/L1 is preferably ⅘ or less, more preferably ⅗ or less, particularly preferably ½ or less. The second terminals 42 of the second terminal block 26 can be used as, for example, input terminals of the transformer 10.

As shown in FIG. 3, the first terminal block 24 is provided with the reinforcement portions 33. The reinforcement portions 33 prevent the first terminal block 24, which is long in the X-axis direction (width direction), from bending and can strengthen the transformer 10. In particular, the reinforcement effect of the reinforcement portions 33 is more effective as the pitch interval L4 shown in FIG. 4 becomes longer.

When the pitch interval L4 is long, a plurality of reinforcement portions 33 may be arranged at predetermined intervals in the X-axis. In the present embodiment, the reinforcement portions 33 are formed at a substantially central position of each of the pitch intervals L4 located on both sides of the terminal block 24 so as to rise from the bottom surface of the terminal-block main body 30.

As shown in FIG. 5, the reinforcement portion 33 includes the wire contact portion 33*a* for contacting with the lead portions 72*a* of the wires drawn from the coil portion 70 to two extension-side first terminals 40*b*, and the wire contact portion 33*a* changes the drawing directions of the lead portions 72*a*. The first terminal block 24 includes the protrusion portions 35 protruding outward along the core axis (Y-axis) of the coil portion 70 from the outside position of the boundary wall 34 in the X-axis at the position between the reinforcement portions 33 and the coil portion 70.

As with the reinforcement portions 33, the boundary wall 34 and the protrusion portions 35 have a reinforcement effect on the first terminal block 24. The protrusion portions 35 are formed so as to protrude from the inner surface 24*d* toward the opposite direction to the direction where the wire contact portions 33*a* of the reinforcement portions 33 protrude inward from the outer surface 24*c* of the terminal block 24 in the Y-axis. Each of the wire contact portions 35*a* is formed at the protrusion tip of the protrusion 35 and is in contact with the lead portions 72*a* of the wires directed to the terminals 40*b*. Each of the wire contact portions 35*a* contacts with the wires and thereby changes the drawing directions of the lead portions 72*a* directed from the coil portion 70 to the wire contact portion 33*a* of the reinforcement portion 33.

The lead portions 72*a* of the wires come into contact with at least the wire contact portions 35*a* and 33*a* while being drawn from the coil portion 70 to the terminals 40*b*, and the drawing directions are changed. Thus, as shown in FIG. 7, it is possible to shorten the length L6 of the free portion 72*a*1 of the lead portion 72*a* between the inflection points P, where the drawing directions are changed. When the length L6 of the free portion 72*a*1 is shortened, the resonance frequency of the lead portion 72*a* of the wire can be increased. Thus, the mounting board (circuit board) not shown and the lead portions 72*a* of the wires are prevented from resonating with each other, and the lead portions 72*a* of the wires become less likely to break.

The wire contact portion 35*a* of the protrusion 35 is disposed closer to the coil portion 70 than the wire contact portion 33*a* of the reinforcement portion 33. Since the wire contact portions 35*a* and 33*a* are arranged in such a manner, the lead portions 72*a* are drawn in zigzag manner, and it is possible to prevent the wires from being broken due to the resonance of the lead portions 72*a* of the wires.

In the present embodiment, preferably, the largest length L6 of the free portions 72*a*1 of the lead portions 72*a* shown in FIG. 7 is 10 mm or less. In such a configuration, it is possible to effectively prevent the lead portions 72*a* of the wires from resonating with the vibration in using the transformer 10, and the lead portions 72*a* become less likely to break.

In the present embodiment, as shown in FIG. 7, the length L6 of the free portion 72*a*1 between the inflection point P of the lead portion 72*a* in contact with the terminal attachment portion 36*b* adjacent to the reinforcement portion 33 and the inflection point P of the lead portion 72*a* in contact with the wire contact portion 33*a* is the longest free portion 72*a*1. The position of the longest free portion 72*a*1 can be changed by changing the positions of the inflection points P and the turn-around angles θ.

In the present embodiment, the corners of the first wire contact portions 33*a*, the second wire contact portions 34*a*, the third wire contact portions 35*a*, and the attachment portions in contact with the wires 72 are curved surfaces. In such a configuration, the pressure applied to the wires 72 is small even if the wires 72 vibrate, and the wires 72 are further less likely to break.

In the present embodiment, preferably, the lead portions 72*a* of the wires 72 have a resonance frequency of 2000 Hz or higher. More preferably, the wires 72 have a resonance frequency of 3000 Hz or higher. Still more preferably, the lead portions 72*a* of the wires 72 have a resonance frequency of 4000 Hz or more. In such a configuration, it is possible to effectively prevent the lead portions 72*a* of the wires from resonating with the vibration in using the transformer 10, and the lead portions 72*a* become less likely to break.

The present invention is not limited to the above-mentioned embodiment and can variously be modified within the scope of the present invention.

In the present embodiment, for example, as shown in FIG. 7, the lead portions 72*a* are accurately divided into five or six free portions 72*a*1, but the number of free portions 72*a*1 may be increased by changing the number of protrusion portions 35 including the reinforcement portions 33 and the shape of the terminal attachment portion and increasing the number of inflection points P. This increases divisions of the free portions and can shorten the length of the free portions 72*a*1. In addition, the first terminal block 24 can be longer in the X-axis.

When a plurality of reinforcement portions 33 exists in the pitch interval L4, at least the reinforcement portion 33 closest to the terminal 40*b* is preferably formed so that the wire contact portion 33*a* protrudes in the opposite direction to the direction where the terminal 40*b* protrudes from the outer surface 24*c* of the terminal block 24 in the Y-axis. Preferably, the reinforcement portions located inside this reinforcement portion 33 include a wire contact portion on its other side. Preferably, the protrusion portions 35 located near the coil portion 70 protrude outward in the core axis of the coil portion 70, and their protrusion tips are provided with the wire contact portions 35*a*.

In the present embodiment, as shown in FIG. 5, the lead portions 72*a* of the wires 72 are bent and connected to the connection portions 41*b*1 of the extension-side first terminals 40*b* at the end of the extension-side terminal attachment portion 36*b* on the outer surface 24*c* side. This makes it possible to shorten the free portions of the lead portions 72*a*. However, the lead portions 72*a* of the wires 72 may be connected to the connection portions 41*b*1 without being bent at this end.

DESCRIPTION OF THE REFERENCE NUMERICAL

10 . . . coil device
20 . . . bobbin
22 . . . cylinder portion
23 . . . through hole
24 . . . first terminal block
24*a* . . . mounting surface
24*b* . . . anti-mounting surface
24*c* . . . outer surface
24*d* . . . inner surface
24*e* . . . first bottom surface
24*f* . . . second bottom surface
26 . . . second terminal block
26*a* . . . mounting surface
26*b* . . . anti-mounting surface
26*c* . . . outer surface
26*d* . . . inner surface
26*e* . . . first bottom surface
26*f* . . . second bottom surface
28*a*-28*c* . . . flange portion
29*a* . . . engagement convex portion
29*b* . . . holding convex portion
30 . . . first-terminal-block main body
30*a* . . . central section
30*b* . . . extension section
32 . . . second-terminal-block main body
32*a* . . . central section
32*b* . . . extension section
33 . . . reinforcement portion
33*a* . . . wire contact portion
34 . . . boundary wall
34*a* . . . wire contact portion
35 . . . protrusion
35*a* . . . wire contact portion
36*a* . . . center-side first terminal attachment portion
36*b* . . . extension-side first terminal attachment portion
37 . . . lead groove
40*a* . . . center-side first terminal
40*b* . . . extension-side first terminal
41*a* . . . center-side first terminal connection piece
41*b* . . . extension-side first terminal connection piece
41*a*1, 41*b*1 . . . connection portion
42 . . . second terminal
43 . . . second terminal connection piece
44 . . . second terminal attachment portion
50 . . . core portion
50*a* . . . first split core
50*b* . . . second split core
52*a*, 52*b* . . . base portion
54*a*, 54*b* . . . middle leg portion
56*a*, 56*b* . . . outer leg portion
70 . . . coil portion
72 . . . wire
72*a* . . . lead portion
80 . . . cover plate
82 . . . attachment ring
84 . . . engagement hole
86 . . . adhesive agent

What is claimed is:

1. A coil device comprising:

a coil portion including wires connectable to terminals; and a bobbin including a first terminal block and a second terminal block formed on both sides in a winding axis direction of a cylindrical portion for forming the coil portion around the cylindrical portion, wherein a length of the first terminal block in a width direction perpendicular to the winding axis direction is larger than that of the second terminal block in the width direction, and the lead portion of at least one of the wires has a resonance frequency of 2000 Hz or higher.

2. A coil device comprising:

a coil portion including wires connectable to terminals; and a bobbin including a first terminal block and a second terminal block formed on both sides in a winding axis direction of a cylindrical portion for forming the coil portion around the cylindrical portion, wherein a length of the first terminal block in a width direction perpendicular to the winding axis direction is larger than that of the second terminal block in the width direction, a lead portion of at least one of the wires drawn from the coil portion to at least one of the terminals is divided into a plurality of free portions, and the free portions have a largest length of 10 mm or less.

3. The coil device according to claim 2, wherein the first terminal block includes an extension section protruding outward from an outline of the coil portion in the width direction, and at least one of the terminals is attached to the extension section.

4. The coil device according to claim 2, wherein the first terminal block includes a reinforcement portion.

5. The coil device according to claim 4, wherein the reinforcement portion includes a first wire contact portion for contacting with a lead portion of at least one of the wires drawn from the coil portion to at least one of the terminals.

6. The coil device according to claim 5, wherein the first wire contact portion changes a drawing direction of the lead portion of at least one of the wires.

7. The coil device according to claim 2, wherein the first terminal block includes a protrusion portion, and the protrusion portion includes a second wire contact portion for contacting with a lead portion of at least one of the wires drawn from the coil portion to at least one of the terminals.

8. The coil device according to claim 7, wherein the second wire contact portion changes a drawing direction of the lead portion of at least one of the wires.

9. The coil device according to claim 7, wherein the first-second wire contact portion is disposed closer to the coil portion than the second-first wire contact portion.

10. A coil device comprising:

a coil portion including wires connectable to terminals; and a bobbin including a first terminal block and a second terminal block formed on both sides in a winding axis direction of a cylindrical portion for forming the coil portion around the cylindrical portion, wherein a length of the first terminal block in a width direction perpendicular to the winding axis direction is larger than that of the second terminal block in the width direction, the first terminal block includes an extension section protruding outward from an outline of the coil portion in the width direction, at least one of the terminals is attached to the extension section, the terminal includes a center-side terminal provided at the extension section and an extension-side terminal provided at the extension section which is located at an outer side than the center-side terminal in the width direction, the center-side terminal and the extension-side terminal are attached to an outer surface of the extension section, the extension section located between the center-side terminal and the extension-side terminal includes a first protrusion portion, the first protrusion portion protrudes inwardly from the outer surface of the first terminal block in the winding axis direction, and the first protrusion portion includes a first contact portion that changes a drawing direction of a lead portion of at least one of the wires.

* * * * *